No. 759,393. PATENTED MAY 10, 1904.
B. J. OTTO.
DEVICE FOR WEEDING AND THINNING OUT PLANTS.
APPLICATION FILED JUNE 26, 1903.
NO MODEL.
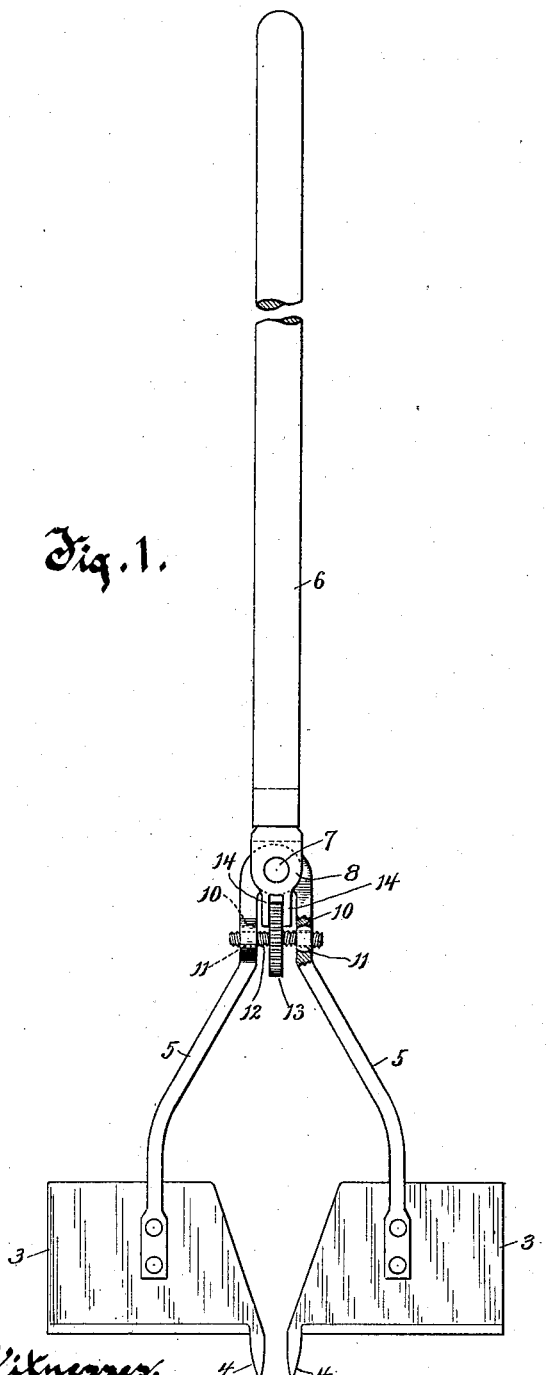
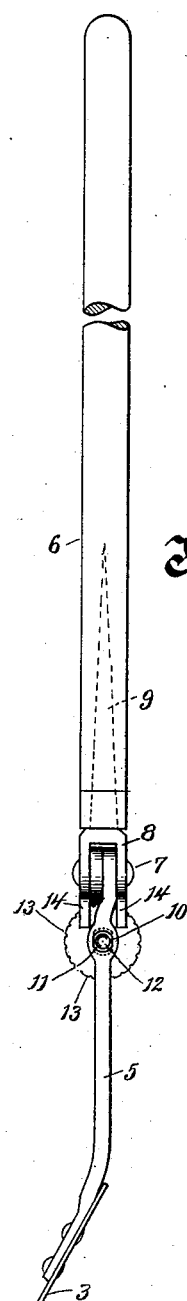

No. 759,393. Patented May 10, 1904.

UNITED STATES PATENT OFFICE.

BENJAMIN J. OTTO, OF WAUKAU, WISCONSIN, ASSIGNOR OF ONE-THIRD TO EDWIN D. OTTO, OF RUSHLAKE, WISCONSIN.

DEVICE FOR WEEDING AND THINNING OUT PLANTS.

SPECIFICATION forming part of Letters Patent No. 759,393, dated May 10, 1904.

Application filed June 26, 1903. Serial No. 163,163. (No model.)

*To all whom it may concern:*

Be it known that I, BENJAMIN J. OTTO, residing at Waukau, in the county of Winnebago and State of Wisconsin, have invented a new and useful Improvement in Devices for Weeding and Thinning Out Plants, of which the following is a description, reference being had to the accompanying drawings, which are a part of this specification.

My invention has relation to improvements in devices for weeding and thinning out plants.

The object of the invention is to provide a simple implement adapted to act as a substitute for a hoe and to avoid the necessity of using the hand for pulling out the weeds and superfluous growth adjacent to the plants.

With the above primary object in view the invention consists of the devices and parts, or their equivalents, as hereinafter more fully set forth.

In the accompanying drawings, Figure 1 is a front elevation of the complete device, parts broken away; and Fig. 2 is a view at right angles to Fig. 1.

Referring to the drawings, the numerals 3 3 indicate two flat knives, preferably of steel and each having its front edge sharpened and beveled. Each knife at the inner end of its front edge is provided with a projection 4. The inner edge of each projection is preferably rounded somewhat in order to avoid tearing the plant when the device is pushed along in a line to receive said plant between the projections. Secured to the upper side of each knife is a shank 5. The shanks are so secured to the knives as to project rearwardly therefrom at a slight angle to said knives. The rear ends of the shanks are brought together and are connected to a suitable handle 6.

In the use of the invention the front edges of the knives rest upon the ground, with the rear edges thereof preferably slightly elevated above the ground. The device is then pushed along, so as to receive a plant between the projections 4 4. The implement is then reciprocated back and forth, and this has the effect of cutting away superfluous growth—as, for instance, grass or weeds—on the sides of the main body or stem of the plant, while at the same time said main body or stem of the plant is protected from injury by reason of the fact that it lies between the projections 4 4. The inner edges of the knives 3 are preferably diverged rearwardly, whereby ample space, especially when the knives are held at a slight rearward incline, is afforded for the branches or thicker portions of the plant near the top of said plant.

I prefer to provide a means for adjusting the knives closer together or farther apart in order to adapt the device to accommodate different sizes of plants. This may be accomplished in any desirable manner, and in the accompanying drawings I show one means for attaining this result. Referring to this feature of the mechanism, it will be seen that the shanks 5 toward their rear ends are brought together and overlapped, and these overlapped portions are mounted on a pivot-bolt 7, the ends of said bolt being carried in the arms of a yoke 8. This yoke has a pointed shank 9, projecting therefrom and entering the handle 6 to thereby serve as the means for connecting the handle. The arms of the yoke are provided with openings 10 10, and in these openings are fitted nuts 11 11. The edge of each nut is rounded or convexed, and the edge of each opening is correspondingly rounded. This permits of a slight rocking play of the shanks 5 on the nuts. The nuts receive the ends of a screw 12. One portion of this screw is provided with right-hand threads and the other portion with left-hand threads. The nut 11, which receives the right-hand-threaded portion of the screw, is interiorly threaded to correspond to said portion of the screw, and the nut which receives the left-hand threads of the screw is also correspondingly threaded interiorly. For convenience in turning the screw said screw is preferably provided between its ends with a rigid hand-wheel 13, said wheel having a milled periphery. From the construction of the adjustable feature as described it will be evident that when the screw is turned in one direction the shanks will be turned on their pivots, so as to spread the forward ends of said shanks outwardly, and consequently increase the distance between the knives, while when the screw is turned in the opposite direction the forward ends of the shanks will be moved in a direction to bring the knives closer together, and thereby decrease the distance between the inner edges of said knives. In thus moving the shanks it is obvious that they must turn in a slight arc of a circle, and by providing the rounded nuts the shanks are permitted to freely turn on the slight arc of a circle referred to. In order to prevent the shanks from swaying or swinging on the pivot 7, the yoke 8 is provided with forwardly-extending projections 14 14, which receive therebetween the hand-wheel 13.

While I have herein shown and described certain specific details of construction, yet I do not wish to be understood as limiting myself thereto, inasmuch as omissions and changes may be made without departing from the spirit and scope of my invention. For instance, the adjustable feature may be dispensed with entirely and the shanks 5 connected directly and rigidly to the handle 6, or instead of employing the specific form of adjustment shown and described the adjustment may be located at the points where the shanks 5 connect with the knives. Again, the forward projections 4 4 of the knives may be entirely dispensed with without departing from the spirit and scope of the invention, although said projections are preferably and advisably employed.

What I claim as my invention is—

1. A device for weeding and thinning out plants, consisting of knives placed a desired distance apart and provided with sharpened front edges, means carried by the knives in advance of the sharpened front edges for guiding the knives, a handle, and means for connecting said handle to the knives.

2. A device for weeding and thinning out plants, consisting of knives placed a desired distance apart provided with sharpened front edges, and having projections extending forwardly from the inner ends of said front edges, a handle, and means for connecting said handle to the knives.

3. A device for weeding and thinning out plants, consisting of knives placed a desired distance apart and provided with sharpened front edges, a rounded forwardly-extending projection on the inner end of each of said front edges, and a handle connected to the knives.

4. A device for weeding and thinning out plants, consisting of knives placed a desired distance apart and provided with sharpened front edges, and a projection extending forwardly from the inner end of each knife in approximately the same plane as said knife.

In testimony whereof I affix my signature in presence of two witnesses.

BENJAMIN J. OTTO.

Witnesses:
JOHN F. KLUWIN,
JOHN KLOECKNER